US011650129B2

(12) United States Patent
Jeketo et al.

(10) Patent No.: US 11,650,129 B2
(45) Date of Patent: May 16, 2023

(54) METHOD OF INSPECTING A SURFACE OF A COMPONENT USING A PROBE

(71) Applicant: Rolls-Royce plc, London (GB)

(72) Inventors: Alejandro Jeketo, Derby (GB); Ben J Walker, Derby (GB); James Kell, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 17/454,703

(22) Filed: Nov. 12, 2021

(65) Prior Publication Data
US 2022/0155179 A1 May 19, 2022

(30) Foreign Application Priority Data

Nov. 17, 2020 (GB) ...................................... 2018028

(51) Int. Cl.
*G01M 15/14* (2006.01)
*B25J 9/16* (2006.01)

(52) U.S. Cl.
CPC ........... *G01M 15/14* (2013.01); *B25J 9/1679* (2013.01)

(58) Field of Classification Search
CPC .............................. G01M 15/14; B25J 9/1679
See application file for complete search history.

(56) References Cited

U.S. PATENT DOCUMENTS

| 4,069,589 | A | 1/1978 | Rameson |
| 5,265,667 | A | 11/1993 | Lester, II et al. |
| 6,076,407 | A * | 6/2000 | Levesque ............... G01N 29/24 |
| | | | 73/866.5 |
| 6,339,326 | B1 * | 1/2002 | Trantow ............... G01N 27/904 |
| | | | 324/238 |
| 6,959,267 | B2 | 10/2005 | Le |
| 8,045,144 | B2 * | 10/2011 | Manfred ............ G01N 21/8806 |
| | | | 356/237.1 |
| 8,395,378 | B2 | 3/2013 | Lawrence et al. |
| 8,749,230 | B1 | 6/2014 | Fogarty et al. |

(Continued)

FOREIGN PATENT DOCUMENTS

| CN | 107228610 A | 10/2017 |
| JP | 2016-80507 A | 5/2016 |

OTHER PUBLICATIONS

Morozov, M. et al., "Off-line scan path planning for robotic NDT," Measurement, vol. 122, pp. 284-290, 2018.

(Continued)

*Primary Examiner* — Eric S. McCall
(74) *Attorney, Agent, or Firm* — Oliff PLC

(57) ABSTRACT

A method of inspecting a surface of a component, e.g. a turbine or compressor blade of a gas turbine engine. The method comprises (a) providing a probe for inspecting the component surface; (b) defining a reference surface that is offset from the component surface; (c) moving the probe so as to contact a plurality of discrete spaced apart inspection points on the component surface, each contact of the probe with an inspection point comprising a first movement of the probe from the reference surface to the inspection point; (d) retracting the probe from the component surface after each contact with an inspection point; and (e) inspecting the component surface each time the probe contacts an inspection point.

15 Claims, 4 Drawing Sheets

(56) References Cited

U.S. PATENT DOCUMENTS

| | | | |
|---|---|---|---|
| 2002/0093330 A1* | 7/2002 | Crouzen | G01N 27/902 |
| | | | 324/240 |
| 2002/0097045 A1* | 7/2002 | Crouzen | G01N 27/902 |
| | | | 324/240 |
| 2005/0171733 A1 | 8/2005 | Hough | |
| 2007/0277600 A1 | 12/2007 | Nokuo et al. | |
| 2008/0257024 A1 | 10/2008 | Watanabe et al. | |
| 2009/0030648 A1 | 1/2009 | Hunter et al. | |
| 2009/0185177 A1* | 7/2009 | Manfred | G01N 21/8806 |
| | | | 702/188 |
| 2010/0101105 A1 | 4/2010 | Hon et al. | |
| 2010/0207619 A1 | 8/2010 | Wu et al. | |
| 2010/0244869 A1* | 9/2010 | Uchida | G01R 1/06722 |
| | | | 324/755.01 |
| 2011/0267047 A1* | 11/2011 | Lawrence | G01N 27/902 |
| | | | 324/238 |
| 2013/0321015 A1* | 12/2013 | Okada | G01R 1/067 |
| | | | 324/754.03 |
| 2014/0327735 A1* | 11/2014 | Ruchet | G01B 9/021 |
| | | | 348/40 |
| 2019/0162756 A1* | 5/2019 | Utsumi | G01R 31/2844 |
| 2020/0393524 A1* | 12/2020 | DeBiccari | G01R 33/1223 |

OTHER PUBLICATIONS

Apr. 13, 2022 extended Search Report issued in European Patent Application No. 21203320.3.

* cited by examiner

METHOD OF INSPECTING A SURFACE OF A COMPONENT USING A PROBE

CROSS-REFERENCE TO RELATED APPLICATIONS

This application claims priority pursuant to 35 U.S.C. 119(a) to United Kingdom Patent Application No. 2018028.7, filed Nov. 17, 2020, which application is incorporated herein by reference in its entirety.

BACKGROUND

Field of the Disclosure

The present disclosure relates to a method of inspecting a component, more particularly the surface of a component. The method may have particular, but not exclusive, use in inspecting components or parts of components that are generally inaccessible and have complex geometries such as turbine or compressor blades of gas turbine engines.

Description of the Related Art

Machines often rely on the integrity of their components in order to operate in an efficient and safe manner. Thus, inspection of components that may be damaged during operation of the machine, or which may be manufactured with defects, is important for the continued operation of the machine.

Components such as compressor and turbine blades of gas turbine engines are subjected to extremes of temperatures for prolonged periods and the lives of passengers and crew travelling on aircraft powered by such engines rely on their integrity. Such blades can develop defects however inspecting them for defects is complicated by being generally inaccessibly located within the engine and typically having complex geometries. One can dismantle an engine to inspect the integrity of the compressor and turbine blades however that is a costly and time consuming operation. Having dismantled an engine, if blades are found to be only partially worn and yet well within safety requirements, they are typically replaced rather than left for a subsequent dismantling, re-inspection and rebuilding of the engine. This can be very wasteful and expensive. It is also important that the compressor and turbine blades are not damaged by the process of dismantling the engine, inspecting the blades and rebuilding the engine.

Various methods for non-destructively testing components are known. Examples include mechanical impedance analysis and eddy current testing (ECT).

Robotic ECT systems exist that typically either perform a single spot check on a component or they scan the component by moving the probe along a surface (i.e. with the probe in constant contact with the surface or at a small fixed standoff distance) in order to detect defects. In both cases such systems are most commonly used to scan cylindrical components due to their constant circumferential geometries, or components with a flat face or surface so that constant probe contact or a constant standoff distance can be achieved while moving the probe across the surface.

Single spot checking robotic ECT systems are of limited utility due to the minimal sampling involved. Constant contact robotic ECT systems are not desirable for components such as compressor and turbine blades where the scraping action of continually passing a probe over the component can damage the component being inspected or the probe.

Known robotic eddy current systems that scan non-axially-symmetric components are only able to do so when the component surfaces are polished and have not been in service (i.e. they can only scan smooth surfaces). Such systems are therefore unsuitable for inspecting components such as gas turbine compressor or turbine blades.

These known methods cannot be directly applied to inspection regions with complex geometries and/or rough surfaces (e.g. that have been in service). Due to the way a robotic arm computes its path between two points, it is difficult to maintain constant probe contact or a constant stand-off distance over anything other than geometries formed of circles or flat surfaces with very tight tolerances. In addition, rough surfaces introduce signal noise that may be misinterpreted as defect signals, and hence the inspection sensitivity is greatly diminished.

Spring-loaded probes can be used, but they do little to mitigate the additional signal noise introduced by rough surfaces and they are prone to probe tip wear. The tip of probe tends to wear very quickly when the probe is moved, more particularly dragged, across the surface, especially when that surface is a rough surface. This wear can be mitigated by applying a protective covering to the tip but this limits the inspection sensitivity even further.

Keeping the probe off the surface by a controlled distance is extremely problematic as the lack of precision with which this can be achieved limits the sensitivity and robustness of the inspection. This hampers the ability to reliably detect the very small defects that are of concern here.

There is a need to address at least some of the issues present in the current methods for inspecting components, particularly when those components are compressor or turbine blades of a gas turbine engine.

SUMMARY OF THE DISCLOSURE

According to a first aspect there is provided a method of inspecting a surface of a component, the method comprising the steps of:
(a) providing a probe for inspecting the component surface;
(b) defining a reference surface that is offset from the component surface;
(c) moving the probe so as to contact a plurality of discrete spaced apart inspection points on the component surface, each contact of the probe with an inspection point comprising a first movement of the probe from the reference surface to the inspection point;
(d) retracting the probe from the component surface after each contact with an inspection point; and
(e) inspecting the component surface each time the probe contacts an inspection point.

In this way the method of the present disclosure involves the probe lightly tapping discrete spaced apart inspection points on the component surface instead of scraping the probe over the component or hovering the probe over the component surface.

Contacting a plurality of discrete inspection points (e.g. performing spot inspections) and retracting the probe between each contact with an inspection point means the probe is substantially stationary when it is in contact with the component surface. As such, the wear of the probe may be eliminated or at least significantly reduced. Temporarily contacting the probe with the surface at a plurality of discrete spaced apart inspection points avoids the significant technical challenges that would be faced in obtaining and maintaining a close but distance from the component surface. Consequently, the method of the present disclosure can effectively minimise probe wear and maximise the accuracy of measurements made during the inspection.

The term "offset", in the context of the reference surface, is used to describe a surface that follows the contour or shape of the component surface but is spaced from the component surface e.g. such that all points on the reference surface have the same stand-off distance from the component surface.

For the avoidance of doubt, the term "reference surface" is not used to describe a physical surface, but is instead used as a spatial reference for defining various movements and positions of the probe.

The reference surface may be defined from 3D data that is representative of the component surface as designed (e.g. CAD data used for the design and/or manufacture of the component). That is, an offset may be applied to the 3D data to define the reference surface.

The reference surface may be offset from the component surface by a stand-off distance. The stand-off distance may be between 0.5 mm and 10 mm. The stand-off distance may be between 0.5 mm and 5 mm, for example between 0.5 mm and 3 mm. The stand-off distance may be between 0.5 mm and 1.5 mm, for example about 1 mm.

The reference surface may comprise an array or grid of reference points.

The probe may be returned to the reference surface after each contact with an inspection point.

Each contact of the probe with an inspection point may further comprise a second movement of the probe from the inspection point to the reference surface.

The movement of the probe may be such that, for every contact of the probe with an inspection point, the probe has the same orientation relative to the surface. For every contact of the probe with an inspection point the probe may be normal to the surface (at the inspection point).

Each inspection point may be spaced from adjacent inspection points by a distance that is selected to maintain detection sensitivity. The distance may be between 0.2 mm and 4 mm, for example between 0.2 mm and 2 mm, or even between 0.1 mm and 1 mm.

Each contact of the probe with an inspection point of the component surface comprises a first movement to the inspection point and a subsequent second movement (in the form of the retraction) from the inspection point. Each contact may thus comprise moving the probe from the reference surface to the inspection point. After each contact of the probe on an inspection point, the probe may be retracted to the reference surface, i.e. may be retracted from the component surface by the stand-off distance. Thus, the first movement may be from the reference surface to the inspection point and the second movement may be from the inspection point to the reference surface.

The movement of the probe to the inspection point, e.g. the first movement, may be in a direction that is normal to the component surface at the inspection point. The retraction of the probe, e.g. the second movement, may be in a direction that is normal to the component surface at the inspection point. Thus, the second movement may be the reverse of the first movement.

The movement of the probe may comprise a third movement. The third movement may be subsequent to each second movement. The third movement may comprise movement of the probe along the reference surface. In this way, the probe may be moved so as to be aligned with, i.e. in the normal direction, but spaced from, a subsequent inspection point for inspection. The method may comprise repeating the first, second and third movements to inspect the plurality of inspection points on the component surface.

In some embodiments, the first movement may be in a direction that is not normal to the component surface at the inspection point. Thus, the first movement may be at an angle to a direction that is normal to the component surface at the inspection point. Similarly, the second movement may be at an angle to the normal. In such embodiments, the movement of the probe from one inspection point to a subsequent inspection point may comprise the second movement, i.e. retraction, from the inspection point and, subsequently, a first movement to the subsequent inspection point. In other words, the path, e.g. tool path, the probe takes may alternate between the reference surface and the component surface, e.g. in a zig-zag pattern.

The movement of the probe may be along a tool path. The method may comprise defining a tool path. The tool path may comprise a plurality of reference points, e.g. an array of reference points, on the reference surface. Each reference point may define a point in the tool path, i.e. the path the probe takes, where the probe begins a first movement, ends a second movement, and/or begins or ends a third movement. For example, each reference point may be spaced from a corresponding inspection point, e.g. by the stand-off distance, in a direction that is normal to the component surface at the inspection point, e.g. where the first/second movements are in the normal direction. Alternatively, each reference point may be positioned on the reference surface so as to be spaced from a point on the component surface, in a normal direction, that is between two inspection points, e.g. so as to define a zig-zag tool path.

The probe may be mounted to a robotic device, such as a robotic arm. The robotic device may comprise an engagement portion for engagement with the probe. Movement of the probe may be by the robotic device. The probe may be maintained in a fixed position relative to the robotic device throughout the movement of the probe. Thus, any of the first, second and/or third movements of the probe, as discussed above, may be performed by moving the robotic device, e.g. the engagement portion, along a tool path representative of the first, second and/or third movements.

In some embodiments the method may comprise moving the probe relative to, and independent of movement of, the robotic device. In this respect, the robotic device, e.g. engagement portion, may be moved along a robotic device path, and the probe may be moved along a probe path, e.g. probe axis, that is relative to the robotic device, e.g. relative to the engagement portion.

In such embodiments, the first and second movement may be performed by moving the probe along the probe path, and the third movement may be performed by moving the robotic device, e.g. engagement portion. In general, moving the probe may comprise a combination of moving the robotic device along a path that is offset from the component surface, e.g. such as along the reference plane, and moving the probe, relative to the robotic device, towards and away from the component surface. Movement of the probe along the reference surface may be provided by moving the robotic device while maintaining the probe in a fixed position relative to the robotic device. Each movement of the probe towards or away from the component surface may be performed by moving the probe relative to the robotic device, e.g. while maintaining the robotic device in a fixed position.

For example, the method may comprise moving the robotic device such that the probe is positioned at a reference point of the reference surface. The method may further comprise extending the probe, relative to the robotic device, along the probe path to an inspection point on the component surface. The method may subsequently comprise retracting the probe along the probe path to the reference surface. The method may comprise moving the robotic device along a path offset from the component surface, e.g. the along the reference surface, so as to move the probe from one inspection point to a subsequent inspection point.

The probe may be an eddy current probe. That is, the probe may be configured to induce eddy currents in the component surface and detect changes in those eddy currents, e.g. due to surface defects. The probe may be configured to provide a signal indicative of the detection of a defect. The probe may comprise a coil or coils for inducing and/or detecting eddy currents in the component surface. The signal provided by the probe may, for example, be a voltage signal proportional to, or at least related to, the impedance changes in the coil.

The probe may include a camera and an illuminated camera system. The illuminated camera system may comprise one or more cameras and one or more light-emitting diodes.

The probe may be spring-loaded. That is, the probe may be mounted to the robotic device by way of a biasing device, e.g. comprising a spring. The biasing device may bias the probe in a direction towards the component surface, e.g. in a direction along the probe path. The biasing device may allow for a larger tolerance in the positioning of the robotic device with respect to the component surface, i.e. while still ensuring contact between the probe and the component surface.

The method may comprise receiving a signal from the probe. The signal may be a voltage signal. The signal may be a continuous, i.e. time-based, signal. That is, the method may comprise operating the probe so as to provide a continuous signal, e.g. throughout the entire inspection of the surface. The method may comprise processing the signal received from the probe. The step of processing the signal may comprise identifying signal portions (of the signal) that are associated with the probe inspecting, i.e. being in contact with an inspection point of, the component surface. The step of processing the signal may comprise isolating the signal portions.

The method may comprise mapping each signal portion to a corresponding inspection point. The method may comprise generating a map of the inspection points and associated signal portions.

The inspection of the component surface may be for defects such as e.g. cracks. The method may comprise determining, for each signal portion, whether the signal portion is indicative of a defect, e.g. a crack, in the component surface, i.e. at or near to the inspection point corresponding to the signal portion. The method may comprise replacing or repairing the component in response to the determination.

The component may be a gas turbine engine blade or vane, such as a turbine blade, a guide vane or a compressor blade. The component may otherwise be a disc or shaft onto which such blades are attached, or the metallic casing that encloses such components. The component may also be any electrically-conductive component for which high-sensitivity defect detection is required after service-running. The component may have non-magnetically permeable coatings or may be coating-free. The component may be a fully-installed component, i.e. in situ, or may have been removed from the machine.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

Figure 1:
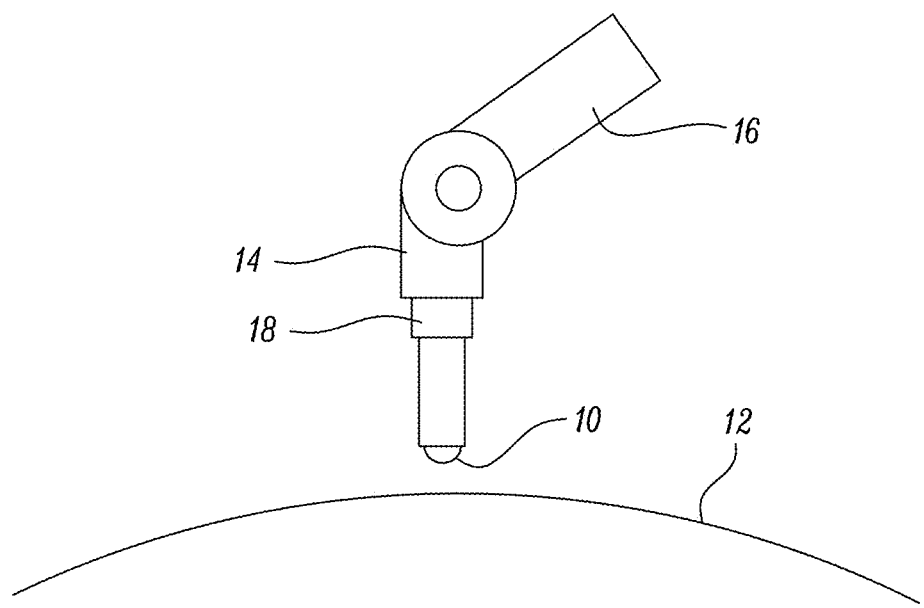
FIG. 1 is a schematic view showing a probe mounted to a robotic device.

The following table lists the reference numerals used in the drawings with the features to which they refer:

| Ref no. | Feature |
|---------|---------|
| 10 | Probe |
| 12 | Surface of a component |
| 14 | Engagement portion |
| 16 | Robotic arm |
| 18 | Biasing device |
| 20 | Tool path |
| 22 | Inspection point(s) |
| 24 | Reference surface |
| 26 | Reference point |
| 28 | Mid-point |
| 30 | Axis |
| 32 | Curved path |
| D | Stand-off distance |
| 40 | Scan noting no defects |
| 42 | Scan noting defects |
| 44 | Component surface map |
| 46 | Spike on scan indicating defect |
| 48 | Spot on component surface map indicating defect |
| 50 | End effector |
| 52 | Snake robot |
| 54 | Linear translation system |

-continued

| Ref no. | Feature |
|---|---|
| 56 | Eddy current coils |
| 58 | Camera |
| 60 | Light emitting diode (LED) |
| 62 | Root of gas turbine engine blade |
| 64 | Gas turbine engine blade |

DETAILED DESCRIPTION OF THE DISCLOSURE

Aspects and embodiments of the present disclosure will now be discussed with reference to the accompanying figures. Further aspects and embodiments will be apparent to those skilled in the art.

FIG. 1 shows a probe, in the form of an eddy current probe 10, for inspecting a surface 12 of a component for defects. The probe 10 is mounted to an engagement portion 14 at the distal end of a robotic device in the form of a robotic arm 16. The probe 10 is mounted to the engagement portion 14 by way of a biasing device 18. The biasing device 18 provides resilient mounting of the probe 10 and allows movement of the probe 10 relative to the robotic arm 16 in the direction of the longitudinal axis of the probe 10. The biasing device 16 biases the probe 10 in a direction away from the engagement portion 14. In this way, when the probe 10 is moved against the component surface 12 there is some yield in the probe 10, i.e. to ensure contact between the probe 10 and the surface 12 can be maintained without the requirement of extremely tight tolerances.

Although not apparent from FIG. 1, the probe 10 may be mounted to the engagement portion 14 in such a way that it is moveable, i.e. other than the biasing, relative to the robotic arm 16. For example, the probe 10 may be moveable by an actuator, e.g. a motor, in the direction along a longitudinal axis of the probe 10, i.e. towards and away from the surface 12 as depicted. In other words, the probe 10 may be extendable and retractable relative to the robotic arm 16.

The probe 10 is configured to induce eddy currents in the component surface 12 and detect differences in those eddy currents, e.g. caused by the presence of surface defects. The probe 10 is configured to provide a signal that can be used to determine the presence of a defect, such as a crack, in the component surface 12. Although not shown, the probe 10 comprises one or more coils for inducing eddy currents in the component surface 12. The signal provided by the probe 10 may, for example, be a voltage signal proportional to, or at least related to, impedance changes in the coil or coils.

Figure 2:
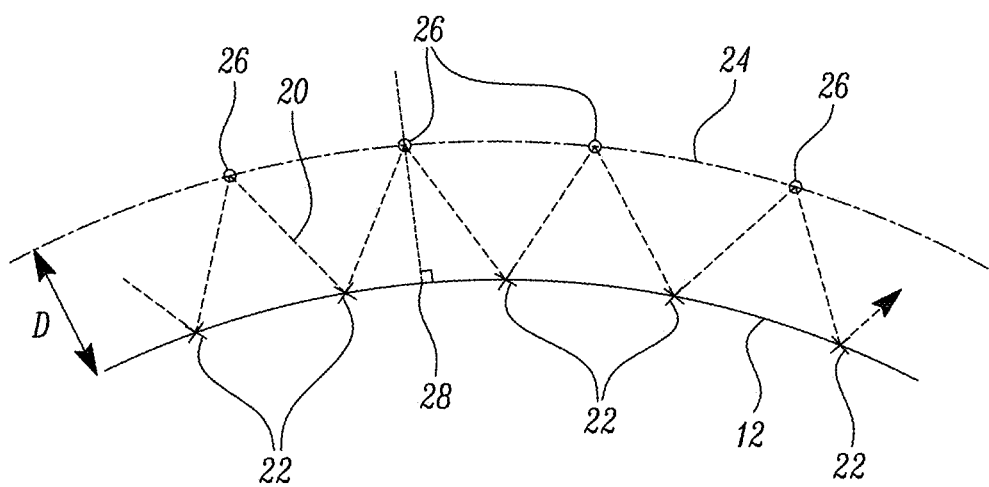
FIG. 2 is a schematic view depicting a method of inspecting a surface according to a first embodiment.

FIG. 2 schematically depicts a method of inspecting a surface 12, according to a first embodiment, using a probe and robotic arm, such as those shown in FIG. 1. In particular, FIG. 2 shows a tool path 20 along which the probe is moved by the robotic arm to inspect the surface 12.

The tool path 20 is defined such that the probe contacts a plurality of discrete spaced apart inspection points 22 on the component surface 12. At each inspection point 22, the component surface 12 is inspected. As should be apparent from the figure, the tool path 20 is such that, after each contact with an inspection point 22, and inspection, the probe is retracted from the component surface 12.

By contacting the plurality of discrete inspection points 22, rather than e.g. dragging across the surface 12, and by retracting the probe between each contact, the probe is substantially stationary when it is in contact with the component surface 12. As such, the wear of the probe may be eliminated or at least significantly reduced. Thus, the method may minimise probe wear, while maintaining the accuracy of any measurements that are made in the inspection.

In order to provide the tool path 20, a reference surface 24 is defined, which is offset from the component surface 12 by a stand-off distance D. As is apparent from the figure, the reference surface 24 follows the shape of the component surface 12, but is spaced therefrom by the stand-off distance D. As such, the curvature of the reference surface 24 has a greater radius than that of the component surface 12, i.e. because of the nature of the offset. The reference surface 24 is not a physical surface, it merely acts as a guide for defining the tool path 20. In the illustrated embodiment, the stand-off distance D is 1 mm.

The reference surface 24 comprises a plurality of reference points 26. Although not apparent from the figure, the reference points 26 are arranged in an organised array or grid so as to be evenly spaced from one another. Each reference point 26 is located so as to be aligned with a mid-point 28 between two inspection points 22. That is, each reference point 26 lies on a line extending in a normal direction from each mid-point 28, e.g. as is shown in the FIG. 2. Also highlighted by the reference line extending from mid-point 28 is the fact that the movement is such that the probe is normal to the component surface 12 throughout its movement, and, importantly, at all inspection points 22.

The reference surface 24 may be generated from 3D data representing the component surface 12. Such 3D data may, for example, be data representing the component surface 12 as designed, such as CAD data used in the manufacture and/or design of the component. The reference surface 24 may be generated from the 3D data by applying an offsetting function to the 3D data. Such offsetting functions are known in e.g. CAD applications.

The reference points 26 aid in defining the tool path 20, which alternates, i.e. zig-zags, between the reference points 26 of the reference surface 24 and inspection points 22 on the component surface 12.

In particular, the tool path 20 is such that each contact of the probe with an inspection point 22 on the component surface 12 comprises first and second movements of the probe. The first movement is movement of the probe from a reference point 26 of the reference surface 24 to an inspection point 22 on the component surface 12. This movement is a diagonal movement of the probe, i.e. so as to be at an angle to a normal direction extending from the component surface 12. The second movement is a retraction of the probe from the inspection point 2 on the component surface 12 to a subsequent reference point 26 of the reference surface 24. Again, this movement is diagonal, with the orientation of the probe being continuously adjusted so as to be normal to the component surface 12.

Between the first and second movements, the probe is positioned so as to be in contact with the component surface 12, at an inspection point 22. The probe does not move across the component surface 12, which reduced wear of the probe. When the probe is in this position, a signal provided by the probe allows the determination of whether there is a defect in the component surface 12 at or near to the inspection point 22.

In the illustrated embodiment, movement of the probe along the tool path 20 may be performed entirely by movement of the robotic arm. In other words, the robotic arm may be controlled to move the probe along the tool path 20 in order to perform inspection of the component surface 12.

Figure 3:
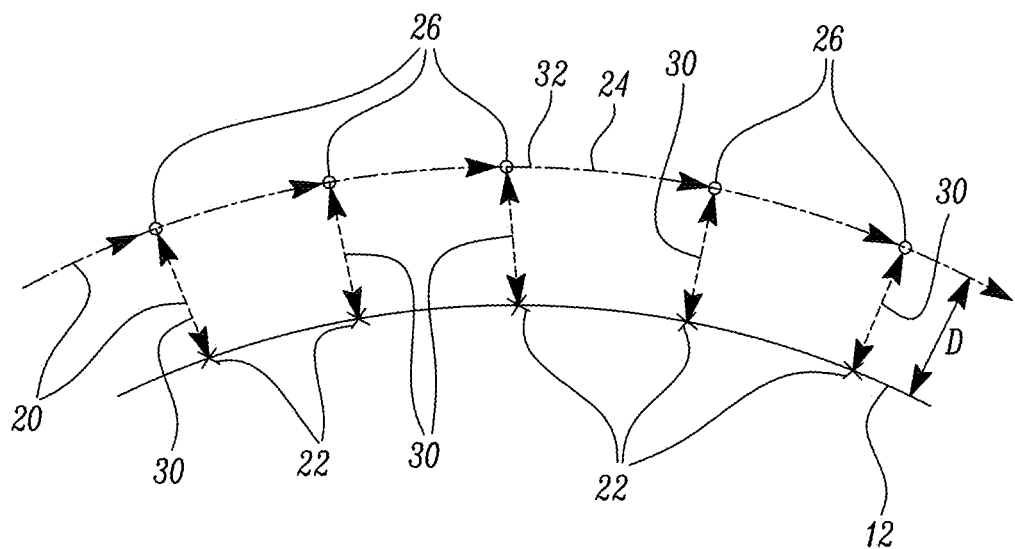
FIG. 3 is a schematic view depicting a method of inspecting a surface according to a second embodiment.

FIG. 3 schematically depicts a method of inspecting a surface 12, according to a second embodiment. The method, again, may make use of a probe and robotic arm as depicted in FIG. 1. The embodiments of FIGS. 2 and 3 share similar features and such features have been given the same reference numerals accordingly.

Again, the method comprises defining a reference surface 24 which comprises a plurality of reference points 26. The reference surface 24 is offset from the component surface 12 by a stand-off distance D.

This embodiment differs from the first embodiment, depicted in FIG. 2, in that each reference point 26 is located so as to lie on a line extending in a normal direction from a corresponding inspection point 22 on the component surface 12. As will be described further below, this means that the tool path 20 does not have a zig-zag profile such as that of the previously described embodiment.

This embodiment also differs in that movement of the probe along the tool path 20 is performed by a combination of movement of the robotic arm and movement of the probe relative to the robotic arm, whereas in the previous embodiment the probe remained fixed relative to the robotic arm. It should be appreciated, however, that the depicted movement could alternatively be performed by movement of the robotic arm exclusively, as per the previous embodiment.

Each contact of the probe with an inspection point 22 is formed of first, second and third movements along the tool path 20. Unlike the previous embodiment, the first and second movements are along an axis that is normal to the component surface 12 at the corresponding inspection point.

In the first movement, the probe is moved from a reference point 26 of the reference surface 24 to an inspection point 22 on the component surface 12 along an axis 30 that is normal to the component surface 12 at the inspection point 22. At the inspection point 22, the probe is able to perform an inspection of the component surface 12.

In the second movement, the probe is moved from the inspection point 22 to a reference point 26 on the reference surface 24. The second movement is a reverse of first movement. That is, the second movement is along the axis 30 normal to the component surface 12 at the inspection point, and thus returns the probe to the same reference point 26 at which the first movement began.

In the third movement, the probe is moved from the reference point 26, i.e. defining the end of the second movement, to a subsequent, adjacent, reference point 26 along a curved path 32 that follows the reference surface 24. The first, second and third movements may then be repeated to inspect all of the inspection point 22 of the component surface 12.

The first and second movements are performed by moving the probe relative to the robotic arm. In particular, the robotic arm is maintained in a stationary position while the probe is extended (first movement) and then retracted (second movement) along a probe path, i.e. corresponding to the axis 30 discussed above. As noted above, the first and second movements could alternatively be performed by movement of the robotic arm rather than the probe, i.e. the probe remaining fixed relative to the robotic arm. In such embodiments, each of the first, second and third movement would be performed by movement of the robotic arm.

The third movement is performed by moving the robotic arm while maintaining the probe in a fixed position relative to the robotic arm. Thus, the robotic arm follows a path, e.g. robotic device path, which provides movement of the probe along the curved path 32, i.e. along the reference surface 24.

By using the combination of these movements, inspection of the component surface 12 can be achieved without relying on providing highly accurate stand-off between the robotic arm and the component surface 12. Rather, any tolerance issues are addressed by movement of the probe and, at least partly, by the probe being spring loaded. In some embodiments, the probe may also be configured to detect contact with the component surface 12, such that once contact is detected, further extension of the probe may be prevented.

Although the embodiments provided above discuss movement of the probe or robotic arm separately, other embodiments may encompass a tool path formed by moving the probe and robotic arm concurrently.

Signal Processing:

The method of the present disclosure uses a probe to inspect the surface of a component, for example a gas turbine engine blade or vane. In embodiments of the present disclosure the probe generates signals as it contacts inspection points on the surface of the component. These signals are processed to provide meaningful information with regard to the presence of any defects, e.g. cracks, in the surface of the component being inspected.

Known methods of inspecting the surface of components using eddy currents tend to suffer from poor signal-to-noise ratios (SNR). This is generally due to continuously monitoring the impedance measured by an eddy current coil as it traverses steadily over a surface, usually remaining in direct contact the surface. When the eddy current coil is on the component, the impedance value will typically vary if there is a defect in the component but also if there is a contact error, for example because the surface contacted is rough, dirty or topologically-complex. This means signals indicating defects are often masked by signals caused by other factors. This significantly limits the defects that can be reliably detected. It also typically encourages undamaged or lightly damaged components to be scrapped, thereby creating unnecessary waste and expensive replacements.

Instead of scraping the probe along a surface and continuously observing relatively small variations in the measured impedance, the method of the present disclosure discretises the inspected surface into inspection spots or points and uses the relatively large impedance difference between the component and air, as well as the fact that the trajectory of this difference varies according to whether a defect is present or not, to map the whole area and more-sensitively detect defects.

Figure 4:
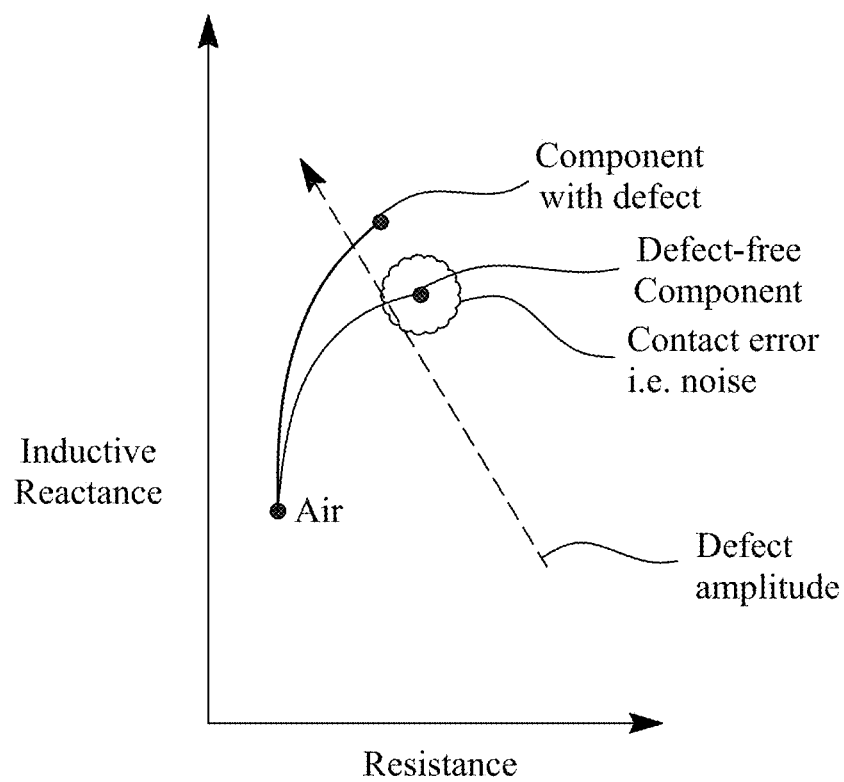
FIG. 4 illustrates the method of the present disclosure in an impedance plane.

FIG. 4 illustrates the method of the present disclosure as represented in an impedance plane. At each inspection spot, the probe moves from air to the component and the measured impedance varies along one of the two paths in the chart, i.e. a trajectory. The point at which this trajectory intersects the defect amplitude axis (whose rotation is optimised for maximum SNR) determines whether a defect is present at that spot or not. The probe is then retracted from the surface and moved over the next inspection spot, ready for the process to be repeated. The impedance still varies because of either a defect in the component (i.e. a signal) or because a contact error (i.e. noise), however the contribution of noise is significantly reduced, and hence the SNR is appreciably improved even if only a small reduction in the signal amplitude is observed.

Figure 5:
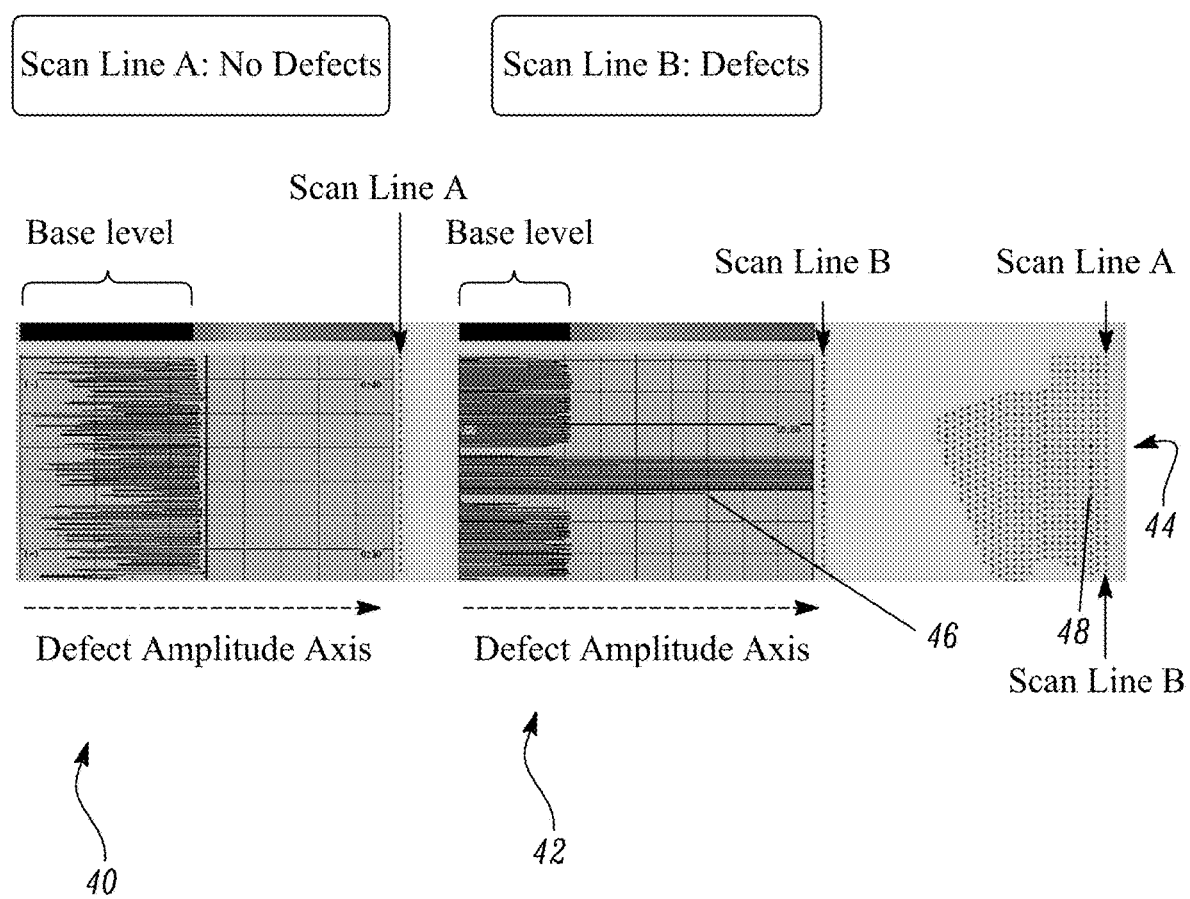
FIG. 5 illustrates scans and a component surface map constructed from such scans.

Repeating the process over a target area of the surface of a component enables a detailed, high-resolution map to be created that shows any defects present. FIG. 5 shows the results of a scan 40 along a line A of the surface of a gas turbine engine blade where no defects are detected in the surface, a scan 42 along a line B of the surface of a gas turbine engine blade where some defects are detected in the surface, and a component surface map 44 constructed from multiple scans that identifies the location of defects in the surface of the gas turbine engine blade. A spike 46 in the scan 42 that results from a defect in the surface of the component is shown as a spot 48 in the map. Each spot represents a trajectory intersecting a defect amplitude axis.

By making point-by-point component and air impedance measurements and observing the trajectory intersection with a defect amplitude axis, the method of the present disclosure maximises the available impedance data to greatly increase signal-to-noise ratio and significantly reduce sensitivity to extraneous influences, such as surface condition and probe placement precision. This enables the method of the present disclosure to be easily, rapidly and cost-effectively industrialised both for either components that have been fully removed from a machine or for components still in situ.

The defect amplitude axis can be set in various ways. The method may be optimised using reference test pieces or suitable numerical calculations. When desired, the trajectory can be measured from another reference, i.e. not air. If desired, trajectory data may be stored for future diagnoses and intelligence.

Probe Construction and Operation:

As mentioned above, the probe used in the method of the present disclosure may be an eddy current probe, i.e. a configured to induce eddy currents in the component surface and detect changes in those eddy currents, e.g. due to surface defects. Various eddy current probes are known however FIGS. 6 to 11 depict eddy current probes that are especially useful in performing the method of the present disclosure.

In the eddy current probes of FIGS. 6 to 11 miniaturised eddy current coils and an illuminated camera system are embedded into the end effector of a snake robot to allow targeted eddy current inspection of gas turbine engine components in situ. Such eddy current probes are particularly suitable for inspecting the surface of a blade or vane of a gas turbine engine. The miniaturised nature of the eddy current probes enables access to surfaces that are generally difficult to access within a gas turbine engine.

Figure 6:
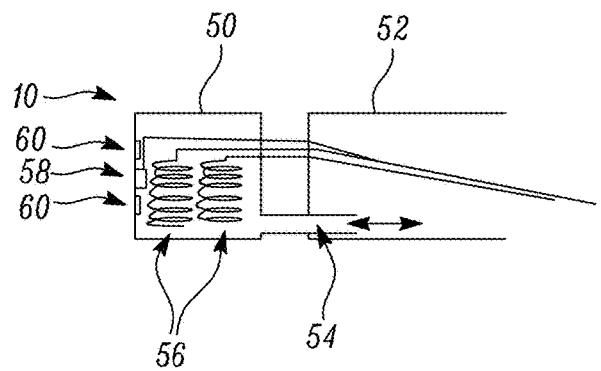
FIG. 6 is a schematic side view of a first embodiment of a probe that is suitable for use in the method of the present disclosure. The probe is an eddy current probe.

FIG. 6 is a schematic side view of a first embodiment of a probe that is suitable for use in the method of the present disclosure. The probe 10 is an eddy current probe embedded in the end effector 50 of a snake robot 52. The snake robot 52 includes a linear translation system 54 in the form of a linearly retractable rod that is configured to move the end effector with respect to the snake robot. The end effector 50 houses eddy current coils 56 and an illuminated camera system that are suitably connected to an externally located signal processing system. In use the end effector 50 lightly taps the surface of the component being inspected. The illuminated camera system can take a variety of forms. In the embodiment shown the illuminated camera system comprises a camera 58 and a plurality of light-emitting diodes 60. If desired the light-emitting diodes or other suitable illumination means can be integrated into the camera. If desired, the eddy current coils may be operated differentially. This lowers the sensitivity to positional accuracy but requires the smooth translation offered by the probe to reliably detect defects. Four eddy current coils can be provided in a square configuration and a switching system may be provided at the control end of the equipment to allow a multitude of operating modes: absolute, differential, and pulse-receive. This would allow a breadth of inspection applications. In the first embodiment of the probe 10 the eddy current 56 coils do not contact the surface of the component being inspected however they are brought in very close proximity to it. The end effector may be made from a non-conductive material, e.g. DELRIN® acetal homopolymer available from DuPont.

Figure 7:
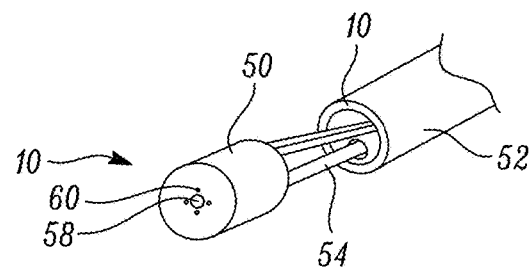
FIG. 7 is a schematic perspective view of the eddy current probe of FIG. 6.

FIG. 7 is a schematic perspective view of the eddy current probe of FIG. 6 with the end effector 50 shown in an extended position. The linear translation system can be provided in various alternative forms. For example the linear translation system can be in the form of a conduit that has both the flexibility to not inhibit gross positioning but the stiffness required to bridge the gap from deployment tube to blade/disc gap once actuated from outside the engine. Alternatively the conduit may have a stiff section that bridges this gap only, and is connected to a more flexible section that cannot extend outside of the deployed probe. In another alternative the conduit may be spring loaded such that the probe is moved into the gap along an internalised rail such that only a highly flexible cable will be needed to withdraw it.

Figure 8:
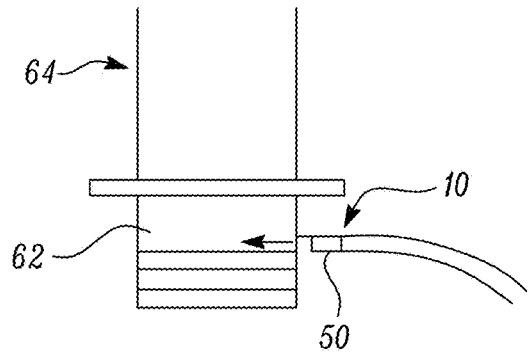
FIG. 8 is a schematic side view of a blade of a gas turbine engine showing the path of the eddy current probe of FIG. 6 when inspecting the surface of a fir tree portion of the blade in the method of the present disclosure.

FIG. 8 is a schematic side view of a blade of a gas turbine engine showing the path of the eddy current probe of FIG. 6 when inspecting the surface of a root 62 of a gas turbine engine blade 64 in the method of the present disclosure. The end effector 50 is shown in its retracted position. Whilst in that position, the probe can be navigated to the surface to be inspected, aided by the illuminated camera system provided in the probe, and optionally assisted by a positioning system (not shown). Once the probe is positioned sufficiently close to the surface to be inspected, the linear translation system is activated to move the end effector 50 adjacent the surface of the root in a manner that enables the end effector to contact a plurality of discrete spaced apart inspection points on the surface of the root. The inspection of the surface of the root can be made on either the extension or retraction of the end effector. In FIG. 8 the inspection is shown to be made on extension of the end effector is extended.

Figure 9:
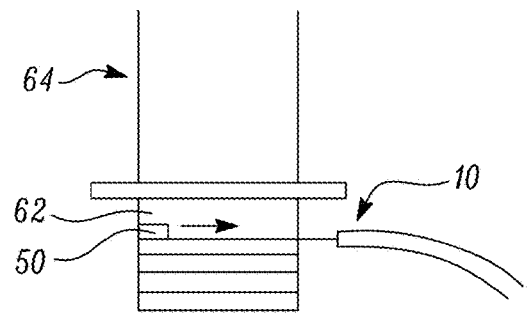
FIG. 9 is a schematic side view of a blade of a gas turbine engine showing the path of the eddy current probe of FIG. 6 when inspecting the surface of a fir tree portion of the blade in the method of the present disclosure.

FIG. 9 is a schematic side view of a blade of a gas turbine engine showing the path of the eddy current probe of FIG. 6 when inspecting the surface of a fir tree portion of the blade in the method of the present disclosure. The end effector 50 is shown in its extended position. In FIG. 9 the inspection is shown to be made on retraction of the end effector is extended. Choosing whether to inspect the surface on extension or retraction of the end effector will typically be determined by whichever the skilled person judges to provide the more controlled inspection.

Figure 10:
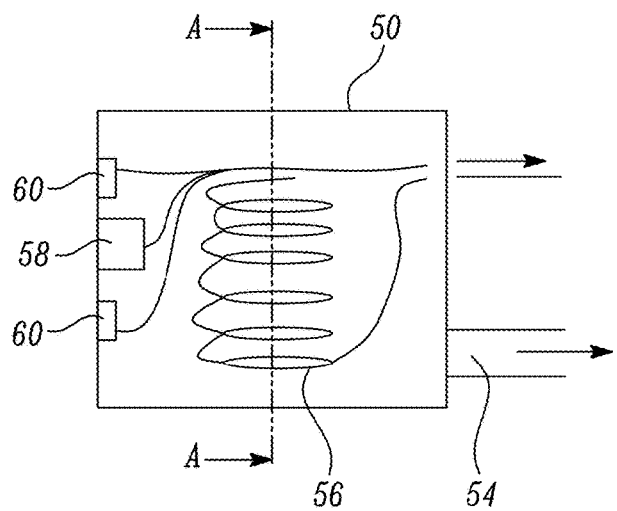
FIG. 10 is a schematic perspective view of a second embodiment of an eddy current probe that is suitable for use in the method of the present disclosure.

FIG. 10 is a schematic perspective view of a second embodiment of an eddy current probe that is suitable for use in the method of the present disclosure. The probe is embedded in the end effector 50 of a snake robot (not shown). The snake robot includes a linear translation system 54 that is configured to move the end effector with respect to the snake robot. The end effector 50 houses eddy current coils 56 and an illuminated camera system that comprises a camera 58 and a plurality of light-emitting diodes 60.

Figure 11:
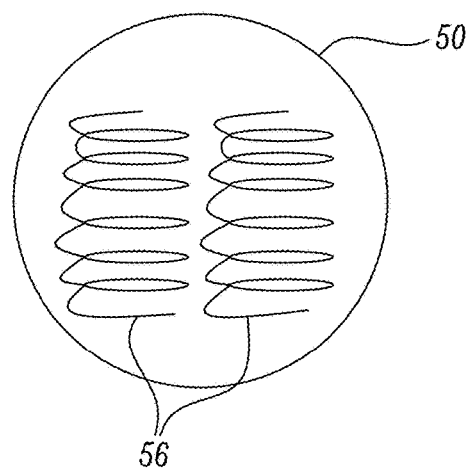
FIG. 11 is a sectional view along the line A-A of the eddy current probe shown in FIG. 10.

FIG. 11 is a sectional view along the line A-A of the eddy current probe shown in FIG. 10. It shows the end effector 50 houses a pair of eddy current coils 56.

It will be understood that the invention is not limited to the embodiments above-described and various modifications and improvements can be made without departing from the concepts described herein.

We claim:

1. A method of inspecting a surface of a component, the method comprising the steps of:

providing a probe for inspecting the component surface, wherein the probe is an eddy current probe;

defining a reference surface that is offset from the component surface;
moving the probe so as to contact a plurality of discrete spaced apart inspection points on the component surface, each contact of the probe with an inspection point comprising a first movement of the probe from the reference surface to the inspection point;
retracting the probe from the component surface after each contact with an inspection point; and
inspecting the component surface each time the probe contacts an inspection point, wherein the inspection comprises eddy current testing.

2. The method of claim 1, wherein movement of the probe is along a tool path and the method further comprises defining the tool path.

3. The method of claim 1, wherein the probe is spring loaded.

4. The method of claim 1, wherein the probe includes a camera and an illuminated camera system.

5. The method of claim 1, wherein the component is a blade or vane of a gas turbine engine.

6. The method of claim 1, further comprising receiving a continuous time-based signal from the probe and identifying portions of the signal that are associated with the probe being in contact with an inspection point of the component surface.

7. The method of claim 6, further comprising determining, for each of the portions of the signal, whether the portions of the signal are indicative of a defect in the component surface.

8. The method of claim 1, wherein each contact of the probe with an inspection point further comprises a second movement of the probe from the inspection point to the reference surface.

9. The method of claim 8, wherein the first and second movements of the probe are each in a direction that is normal to the component surface at the inspection point.

10. The method of claim 8, wherein the first and second movements of the probe are each in a direction that is at an angle to a direction normal to the component surface at the inspection point.

11. The method of claim 8, wherein each contact of the probe with an inspection point further comprises a third movement of the probe along the reference surface.

12. The method of claim 1, wherein the probe is mounted to a robotic device.

13. The method of claim 12, wherein the probe is moved relative to the robotic device.

14. The method of claim 12, wherein movement of the probe is by the robotic device and the probe is maintained in a fixed position relative to the robotic device throughout the movement of the probe.

15. The method of claim 14, wherein movement of the probe along the reference surface is provided by moving the robotic device while maintaining the probe in a fixed position relative to the robotic device, and each movement of the probe towards or away from the component surface is performed by moving the probe relative to the robotic device.

* * * * *